No. 611,936. Patented Oct. 4, 1898.
R. PRATT, Jr.
GATE.
(Application filed June 3, 1898.)
(No Model.)
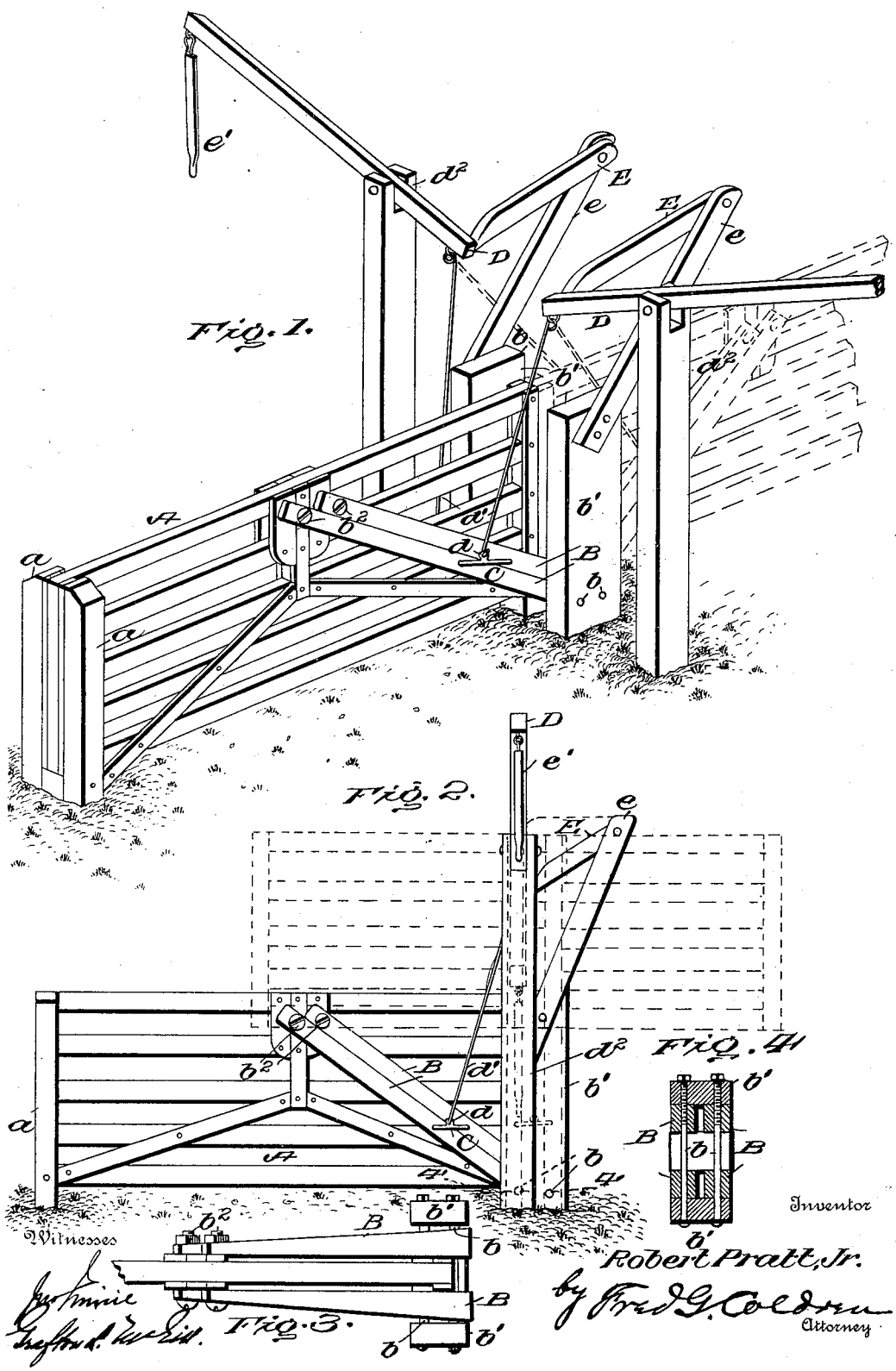
Inventor
Robert Pratt, Jr.
by Fred G. Coldren
Attorney

United States Patent Office.

ROBERT PRATT, JR., OF ARMINGTON, ILLINOIS.

GATE.

SPECIFICATION forming part of Letters Patent No. 611,936, dated October 4, 1898.

Application filed June 3, 1898. Serial No. 682,921. (No model.)

*To all whom it may concern:*

Be it known that I, ROBERT PRATT, Jr., of Armington, in the county of Tazewell and State of Illinois, have invented certain new and useful Improvements in Gates; and I do hereby declare the following to be a full, clear, and exact description of the invention, such as will enable others skilled in the art to which it appertains to make and use the same.

This invention contemplates certain new and useful improvements in gates, and relates to that class having means for operating the gate extended at right angles thereto, whereby a gate may be opened and closed without the necessity of dismounting from a horse or vehicle.

The object of the invention is to provide improved, simple, and highly-efficient means for swinging a gate longitudinally of its length out of and into position. The gate is supported by two pivotally-mounted bars on each side thereof, said bars being connected to the center of the gate at its top. Two operating-levers extended in opposite directions are connected to a pivoted connection between said bars, and the inner ends of said levers have secured thereto arms which are mounted on stationary supports. By pulling downward on either lever the gate will be raised bodily and swung longitudinally of its length, dropping into proper position as the limits of its movements are reached.

The invention will be hereinafter fully set forth, and particularly pointed out in the claims.

In the accompanying drawings, Figure 1 is a view in perspective of my improved gate. Fig. 2 is a side view, the gate being shown raised in dotted lines. Fig. 3 is a top plan view. Fig. 4 is a cross-sectional view on line 4 4, Fig. 2.

Referring to the drawings, A designates a gate proper, which is preferably of rectangular form, and when in its normally-lowered position its outer end fits between two posts $a$.

B B designate two swinging bars, four of which are employed, two being on each side of the gate. At their lower ends these bars are mounted on cross-rods $b$, which extend between and are supported by two posts $b'$. These bars B taper throughout their length, the widened portions being provided with transverse openings to accommodate the rods $b$. At their outer ends these bars B are pivotally united to the upper central portion of gate A by two nutted bolts $b^2$. When the latter is lowered, the adjacent edges of each pair of bars are in contact; but when the gate is raised to its highest point directly above the pivots of said bars the latter stand apart from each other. The bars of each pair are connected by a rod C, the ends of which are loosely fitted in holes in said bars. Each rod C has a central eye $d$, in which is secured the lower end of a link or chain $d'$. These links or chains $d'$ are connected at their upper ends to the short arms of two levers D, which latter are fulcrumed on posts $d^2$. Also to the ends of these short arms of said levers are loosely connected the ends of two arms E, which are pivotally mounted on the outer ends of two obliquely-disposed braces $e$, which are mounted on posts $b'$. The operating-levers D extend in opposite directions from and at right angles to the gate A. At their outer ends they are provided with hanging handles $e'$.

In practice by pulling downward on the outer end of either lever the two pairs of bars B will be swung on their supporting-rods so as to describe the arc of a circle. This is effected by the connections between the cross-rods C and the inner ends of the levers. The gate being centrally mounted on the outer ends of these swinging bars will be elevated by the latter and swung rearward, and upon the full limit of its movement being reached the outer end of the gate will be between the two posts $b'$. When the gate is thus swung backward, the swinging bars B occupy the same relative position as when the gate is forward, save that the then lowermost bar B is the upper bar of each pair when the gate is forward. By this means the gate is prevented from wabbling or moving laterally, being securely mounted between the two pairs of bars. By means of the pivoted arms E the operating-levers are guided in their movements and the downward movement of the gate is limited, since said arms prevent the inner ends of the levers being lowered too great distances.

A gate constructed in accordance with my invention is simple and inexpensive and not liable to readily get out of order. Its movement in either direction cannot be impeded by the presence of any stones or the like, as occurs with gates which move on a straight line.

I claim as my invention—

1. The combination with the gate, of the two pairs of swinging bars, one pair being arranged on each side of said gate, supporting-posts, cross-rods supported by said posts and forming the pivot-bearings for said bars, nutted bolts forming pivot connections between said bars and gate, connecting-rods between the bars of each pair having central eyes, operating-levers having links or chains connecting said levers to the eyes of said rods, and the pivoted arms connected to the inner ends of said levers, substantially as set forth.

2. The combination with the gate, and two posts on either side thereof, of two rods supported by said posts, two pairs of swinging bars arranged on opposite sides of said gate, said bars being tapered and having openings in their lower widened ends to accommodate said rods, nutted bolts connecting the outer ends of said bars to the upper central portion of said gate, each bolt forming the connection for one bar of each pair of bars, connecting-rods between the bars of each pair, operating-levers, links connecting the inner ends thereof to said connecting-rods, braces projecting from said posts, and arms pivotally mounted on the outer ends of said braces and connected to the inner ends of said levers, substantially as set forth.

In testimony whereof I have signed this specification in the presence of two subscribing witnesses.

ROBERT PRATT, JR.

Witnesses:
C. W. RITTER,
ADAM KIESLING.